United States Patent
Kang et al.

(10) Patent No.: US 11,915,836 B2
(45) Date of Patent: Feb. 27, 2024

(54) COOLING SYSTEM IN A NUCLEAR PLANT

(71) Applicant: KOREA ATOMIC ENERGY RESEARCH INSTITUTE, Daejeon (KR)

(72) Inventors: Kyungjun Kang, Jeollabuk-do (KR); Moon Jung, Daejeon (KR); Jihan Chun, Daejeon (KR); Hanok Kang, Daejeon (KR)

(73) Assignee: KOREA ATOMIC ENERGY RESEARCH INSTITUTE, Daejeon (KR)

(*) Notice: Subject to any disclaimer, the term of this patent is extended or adjusted under 35 U.S.C. 154(b) by 78 days.

(21) Appl. No.: 17/097,407

(22) Filed: Nov. 13, 2020

(65) Prior Publication Data

US 2021/0210227 A1     Jul. 8, 2021

(30) Foreign Application Priority Data

Nov. 15, 2019     (KR) .................. 10-2019-0146849

(51) Int. Cl.
    *G21C 15/18*     (2006.01)
    *G21C 15/16*     (2006.01)
    *G21C 15/253*    (2006.01)

(52) U.S. Cl.
    CPC ............. *G21C 15/18* (2013.01); *G21C 15/16* (2013.01); *G21C 15/253* (2013.01)

(58) Field of Classification Search
    CPC ........ G21C 15/18; G21C 9/004; G21C 13/02; G21D 3/04
    (Continued)

(56) References Cited

U.S. PATENT DOCUMENTS 5,102,617 A * 4/1992 Gluntz ................... G21C 9/004
                                                      376/283
7,680,237 B1 * 3/2010 Meseth .................. G21C 15/18
                                                      376/283
(Continued)

FOREIGN PATENT DOCUMENTS

JP     H07-098396 A       4/1995
JP     H0798396 A *      11/1995
(Continued)

*Primary Examiner* — Jack W Keith
*Assistant Examiner* — Daniel Wasil
(74) *Attorney, Agent, or Firm* — Scully, Scott, Murphy & Presser, P.C.

(57) ABSTRACT

A cooling system in a nuclear power plant is disclosed, including a boundary section disposed inside a containment to enclose a reactor coolant system, and configured to restrict steam containing radioactive materials generated in the reactor coolant system from leaking into paths other than a discharge part. An In-Containment Water Storage Tank (IRWST) is disposed outside the boundary section and is configured to store refueling water therein. An emergency cooling tank is disposed outside the containment and is provided with a condensation heat exchanger. A gas-liquid separator is connected to the emergency cooling tank outside the containment. A return line is configured to connect the gas-liquid separator and the boundary section such that condensate generated by condensing the steam within the boundary section, through the emergency cooling tank and the gas-liquid separator, is discharged toward the boundary section upon an occurrence of a nuclear power plant accident.

8 Claims, 4 Drawing Sheets

(58) Field of Classification Search
USPC .................................................. 376/282, 283
See application file for complete search history.

(56) References Cited

U.S. PATENT DOCUMENTS

| | | |
|---|---|---|
| 2008/0025455 A1 | 1/2008 | Hisajima et al. |
| 2013/0259184 A1* | 10/2013 | Sato .......................... G21C 9/06 |
| | | 376/293 |
| 2014/0016734 A1* | 1/2014 | Moon .................... G21C 15/18 |
| | | 376/282 |
| 2014/0112426 A1* | 4/2014 | Ikegawa ................ G21C 15/18 |
| | | 376/282 |
| 2015/0221403 A1* | 8/2015 | Kim ....................... G21C 9/004 |
| | | 376/203 |

FOREIGN PATENT DOCUMENTS

| | | |
|---|---|---|
| JP | 2015-197394 A | 11/2015 |
| KR | 10-1022164 B1 | 3/2011 |
| KR | 101242743 B1 * | 3/2013 |
| KR | 10-1743910 B1 | 6/2017 |
| KR | 10-2018-0047849 A | 5/2018 |
| KR | 10-2018-0103373 A | 9/2018 |
| KR | 10-2018-0128796 A | 12/2018 |

* cited by examiner

COOLING SYSTEM IN A NUCLEAR PLANT

CROSS-REFERENCE TO RELATED APPLICATION

Pursuant to 35 U.S.C. § 119(a), this application claims the benefit of the earlier filing date and the right of priority to Korean Patent Application No. 10-2019-0146849, filed on Nov. 15, 2019, the contents of which is incorporated by reference herein in its entirety.

BACKGROUND

1. Technical Field

The present disclosure relates to a long-term cooling system in a nuclear power plant for improving safety of the nuclear power plant, and a long-term cooling method using the same.

2. Description of the Related Art

Nuclear reactors are divided into active reactors and passive reactors depending on the implementation of a safety system. The active reactor is a reactor using an active component, such as a pump operated by electric power from an emergency generator or the like to drive the safety system. The passive reactor is a reactor using a passive component operated by passive power such as gravity or gas pressure to drive the safety system.

When an accident occurs in the passive reactor, the passive safety system may maintain the reactor in a safe condition for at least a period of time (three days, namely, 72 hours) according to the regulatory requirements by using only natural forces integrated in the system even without any operator actions or AC power of safety class such as an emergency diesel generator. The operator action and non-safety system involvement is allowable in the passive safety system operation after 72 hours to maintain the functions of the safety system and emergency DC power.

However, even after the period of time, namely, three days according to the regulatory requirements in the event of the accident, unlike a general thermal power plant where heat generation is stopped when fuel supply is stopped, a reactor in a nuclear power plant generates residual heat from a reactor core for a significant period of time by a fission product produced and accumulated during a normal operation even when a fission reaction is stopped in the reactor core. Accordingly, a variety of safety systems for removing the residual heat from the core during an accident are installed in the nuclear power plant.

In order to exclude an active component such as a pump that requires a large amount of electricity, a driven force such as gas pressure or gravity is introduced in a passive nuclear reactor (U.S. Westinghouse AP1000, Korean SMART) that has been developed or is being developed to enhance the safety of the nuclear power plant.

In particular, long-term cooling may be performed to remove residual heat in the event of a nuclear power plant accident. Long-term cooling in a nuclear reactor in the related art has been performed by large-scale cooling facilities using seawater. Such large-scale cooling facilities using seawater have caused an increase in the construction cost of a nuclear power plant.

Furthermore, long-term cooling using seawater may be performed only when seawater is in a short distance, so it has been a factor that limits conditions of location of a nuclear power plant. In addition, for long-term cooling using seawater, a pump must be provided to use seawater as a cooling source. If the pump cannot be operated, long-term cooling is not possible, which may cause a disaster such as nuclear fuel melting or hydrogen explosion.

The Prior art literature, US Laid-Open Patent Publication No. US 2008/0025455 A1 (Jan. 31, 2008) discloses an Emergency Core Cooling System (ECCS) that is configured with a Reactor Isolated Cooling System (RCIC), a High Pressure Core Flooder (HPCF), and a Residual Heat Removal System (RHR), and has a configuration including an RHR heat exchanger. In addition, Korean Patent Registration Application No. 10-1022164 (Mar. 7, 2011) discloses a configuration in which a heat exchanger in a condensate tank condenses steam supplied from a steam generator.

In the related art nuclear power plant, it is necessary to perform long-term cooling using seawater for removing residual heat generated during a nuclear power plant accident. However, for the long-term cooling in the nuclear power plant, the seawater must be in a short distance, and a pump must be used to use the seawater. This causes a problem that a long-term cooling heat source disappears when the pump cannot be operated.

SUMMARY

An aspect of the present disclosure is to provide a long-term cooling system in a nuclear power plant, capable of improving safety by performing long-term cooling inside the nuclear power plant using an Emergency Cooling Tank (ECT) and a Gas-Liquid Separator, other than large-scale facilities for seawater cooling, upon an occurrence of an accident of the nuclear power plant.

According to an aspect of the present disclosure to achieve the above or other advantages, there is provided a long-term cooling system in a nuclear power plant which may include a containment, a boundary section disposed within the containment to enclose a reactor coolant system, and divided into a first boundary area and a second boundary area to restrict steam containing radioactive materials generated in the reactor coolant system from leaking into paths other than a discharge part, an In-Containment Refueling Water Storage Tank (IRWST) disposed outside the boundary section and configured to store refueling water therein, an emergency cooling tank disposed outside the containment and provided with a condensation heat exchanger, a gas-liquid separator disposed outside the containment and connected to the emergency cooling tank, and a return line configured to connect the gas-liquid separator and the boundary section such that condensate, which is generated by condensing the steam within the boundary section through the emergency cooling tank and the gas-liquid separator, is discharged toward the boundary section upon an occurrence of a nuclear power plant accident.

In the long-term cooling system, steam and air discharged to the containment may be introduced into the condensation heat exchanger through a steam line upon the occurrence of the nuclear power plant accident, and at least part of the introduced steam may be condensed and introduced into the gas-liquid separator disposed at a rear end of the condensation heat exchanger, so as to be separated into non-condensable gas and the condensate.

In the long-term cooling system, the non-condensable gas separated through the gas-liquid separator may flow into the containment along a non-condensable gas line, and the condensate separated through the gas-liquid separator may flow into the first boundary area along the return line.

In the long-term cooling system, the return line may be disposed such that the condensate separated in the gas-liquid separator passes through the in-containment refueling water storage tank.

In the long-term cooling system, the steam and air accommodated in the second boundary area may be introduced into the condensation heat exchanger of the emergency cooling tank as a steam line valve, a non-condensable gas line valve, and a return line valve are open by power supplied from a battery during the nuclear power plant accident.

In the long-term cooling system, the emergency cooling tank may store emergency cooling water therein to exchange heat with the steam discharged from the boundary section within the condensation heat exchanger. The system may further include an emergency cooling water makeup line configured to make up externally supplied emergency cooling water into the emergency cooling tank.

In the long-term cooling system, the steam accommodated in the boundary section may be discharged into the refueling water accommodated in the ion-containment refueling water storage tank through a discharge line by a pressure difference between inside and outside of the boundary section during the nuclear power plant accident.

In the long-term cooling system, the discharge line may be provided with a check valve disposed therein to prevent backflow, and the steam within the boundary section may be discharged into the refueling water accommodated in the in-containment refueling water storage tank through a jet device. Here, the jet device may be disposed in a lower end portion of the discharge line to be adjacent to a bottom surface of the in-containment refueling water storage tank and provided with a plurality of jet holes.

In the long-term cooling system, the in-containment refueling water storage tank may be provided with a radioactive material suppression tank disposed on an upper end thereof to accommodate alkaline cooling water.

In the long-term cooling system, the boundary section may include a first boundary portion disposed to enclose the reactor coolant system, and a second boundary portion communicating with the first boundary portion and disposed to enclose a safety injection system for injecting emergency cooling water into the reactor coolant system.

In the long-term cooling system, the safety injection system may include at least one of a safety injection tank and a core makeup tank connected to the reactor coolant system in a communicating manner.

A long-term cooling method using a long-term cooling system in a nuclear power plant according to the present disclosure may include discharging steam and radioactive materials emitted from a reactor into a boundary section inside a containment by a depressurization system, opening a steam line valve to discharge a mixture of steam and air within an upper portion of a first boundary area, introducing the steam and air toward a condensation heat exchanger disposed inside an emergency cooling tank provided outside the containment, condensing at least part of the steam of the introduced steam and air in the condensation heat exchanger to introduce the condensed steam into a gas-liquid separator disposed at a rear end of the condensation heat exchanger, and introducing condensate separated in the gas-liquid separator into the first boundary area through a return line.

According to the present disclosure, residual heat emitted from a nuclear reactor upon an occurrence of a nuclear power plant accident can be cooled for a long term of time through air-cooling using an emergency cooling tank disposed in the nuclear power plant, instead of using seawater.

According to the present disclosure, large-scale facilities for seawater cooling may be excluded, which may enable long-term cooling even when it is impossible to use a seawater cooling pump.

According to the present disclosure, steam generated upon an occurrence of a nuclear power plant accident and a mixed gas of non-condensable gas and steam within an area (LCA) enclosing a reactor inside a containment may be condensed through a condensation heat exchanger disposed in an emergency cooling tank and may be divided into non-condensable gas and condensate using a gas-liquid separator, so as to prevent operation efficiency of the condensation heat exchanger from being lowered due to the non-condensable gas discharged into the area (LCA) enclosing the reactor, resulting in improving long-term cooling performance.

DETAILED DESCRIPTION OF THE EMBODIMENTS

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In describing the present disclosure, moreover, the detailed description will be omitted when a specific description for publicly known technologies to which the disclosure pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms.

These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
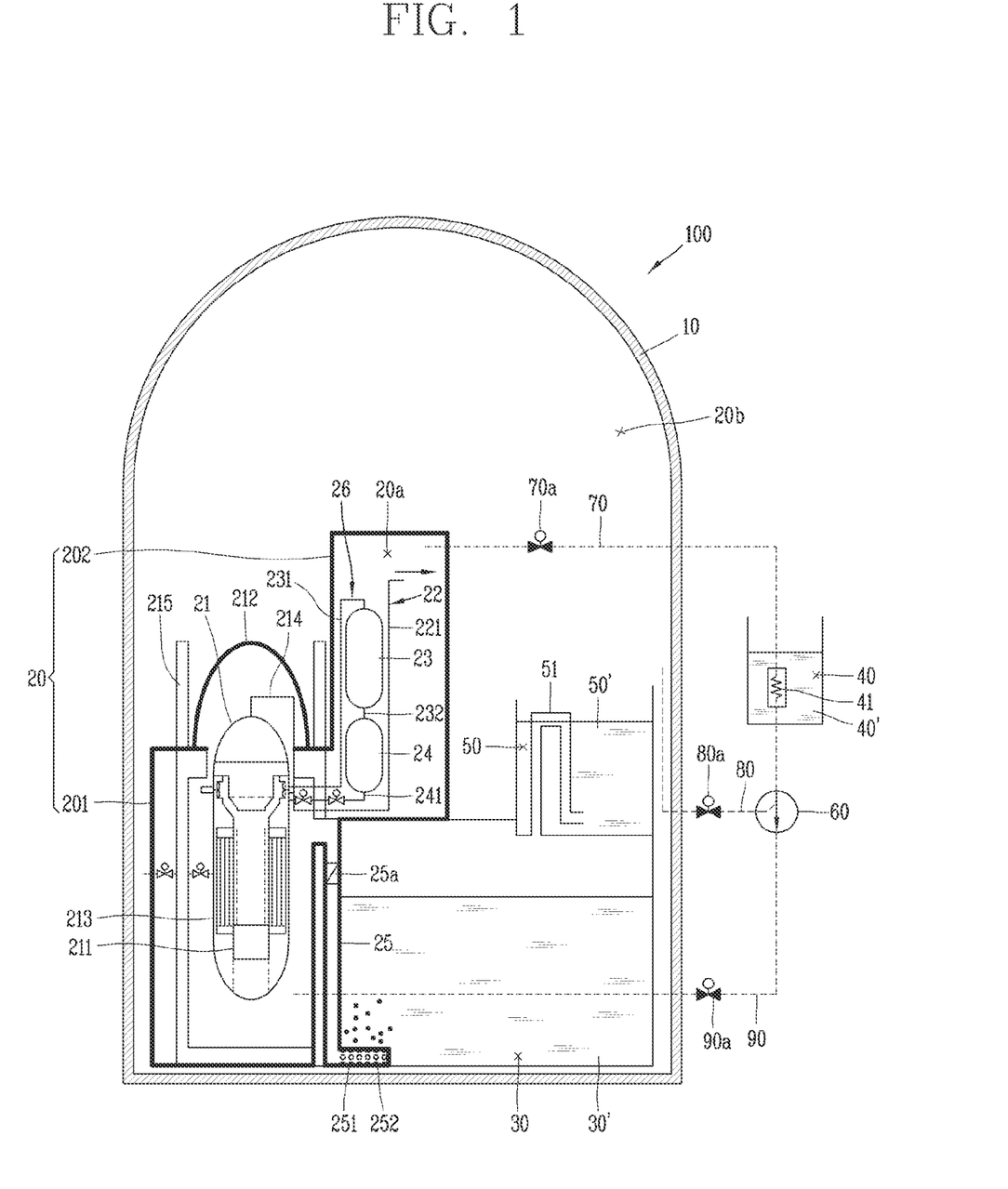
FIG. 1 is a conceptual diagram illustrating a nuclear power plant having a long-term cooling system equipped with a gas-liquid separator in accordance with the present disclosure.

FIG. 1 is a conceptual diagram illustrating a nuclear power plant 100 having a long-term cooling system equipped with a gas-liquid separator in accordance with the present disclosure.

Referring to FIG. 1, the nuclear power plant 100 may include a containment (containment building) 10, a boundary section 20, an In-Containment Refueling Water Storage Tank (IRWST) 30, an Emergency Cooling Tank (ECT) 40, a radioactive material suppression tank 50 that is a pH-controlled water tank, and a gas-liquid separator 60.

The boundary section 20 provided inside the containment 10 may be divided into a first boundary area (Lower Containment Area (LCA)) and a second boundary area (Upper Containment Area (UCA) of a radioactive material suppression facility.

The first boundary area (LCA) may be referred to as a first space 20a of an inner area of the boundary section 20, and the second boundary area (UCA) may be referred to as a second space 20b that is an upper area inside the containment building at the outside of the boundary section 20. The boundary section 20 may partition the first space 20a and the second space 20b from each other.

The first space 20a may accommodate a reactor coolant system 21. The second space 20b may be defined between the first space 20a and the containment 10. In detail, the second space 20b may be defined as a large space compared to the first space 20a. The second space 20b may be defined in the containment 10.

The boundary section 20 may be divided into a first boundary portion 201 and a second boundary portion 202.

The first boundary portion 201 may accommodate the reactor coolant system 21 therein. The reactor coolant system 21 may be accommodated in a refueling pool 215 having an upper portion open. A Containment Pressure and Radioactivity Suppression System (CPRSS) may be provided with a CPRSS cover 212 and may be disposed to open and close the opening of the refueling pool 215.

The second boundary portion 202 may communicate with one side of an upper part of the first boundary portion 201. The second boundary portion 202 may include an Automatic Depressurization System (ADS) 22 that is decompressed through a depressurization line 214 on the top of the reactor coolant system 21, a Safety Injection Tank (SIT) 23, and a Core Makeup Tank (CMT) 24.

A discharge line 25 and a check valve 25a may be disposed at one side inside the boundary section 20. For example, the discharge line 25 may be disposed between the one side of the boundary section 20 and the IRWST 30.

The reactor coolant system 21 may be configured to circulate cooling water to remove heat from a core 211 and internal structures, and to transfer heat generated from the core 211 to a steam generator. The reactor coolant system 21 refers to a reactor vessel in the case of an integral reactor. A reactor coolant pump which is not shown may be provided inside the reactor vessel. The reactor coolant pump may forcibly circulate cooling water to a primary flow path of the steam generator. A pressurizer may be placed on the top of the reactor vessel. The pressurizer may play a role of keeping pressure of the reactor coolant system 21 constant.

The second boundary portion 202 extending upward from the upper part of the first boundary portion 201 may be configured to accommodate the automatic depressurization system 22, the safety injection tank 23, and the core makeup tank 24. The automatic depressurization system 22, the safety injection tank 23, and the core makeup tank 24 may configure a passive safety injection system by organically operating together when an accident occurs in the nuclear power plant 100.

The automatic depressurization system 22 may be configured to lower internal pressure of the reactor coolant system 21 down to a predetermined level or less to prevent damage of the reactor coolant system 21 of the nuclear power plant 100 due to overpressure. The automatic depressurization system 22 may include a depressurization line 221 and a plurality of valves disposed along the depressurization line 214. One side of the automatic depressurization system 22 may be connected to communicate with the reactor coolant system 21, which is an upper end part of the reactor vessel, and another side of the automatic depressurization system 22 may extend from an upper space of the first boundary portion 201 to communicate with an upper space of the second boundary portion 202. The automatic depressurization system 22 may transfer steam from the reactor coolant system 21 to the upper space of the second boundary portion 202 when the internal pressure of the reactor coolant system 21 rises above a preset pressure.

A safety injection system 26 may be configured to inject safety injection water into the reactor coolant system 21 when an accident occurs in the nuclear power plant 100. The safety injection tank 23 and the core makeup tank 24 may be configured to inject the safety injection water such as boric acid water into the reactor coolant system 21.

The implementation illustrates that the safety injection tank 23 and the core makeup tank 24 are connected by a series line, but the present disclosure may not be limited thereto. Those tanks may alternatively be connected by a parallel line.

The safety injection system 26 may include the safety injection tank 23, the core makeup tank 24, a pressure balance line 231, and a safety injection line 241.

The safety injection tank 23 may be disposed above the core makeup tank 24. The safety injection tank 23 and the core makeup tank 24 may be connected by a connection line 232 to communicate with each other. The safety injection water (boric acid water) stored in the safety injection tank 23 may be injected into the core makeup tank 24 through the connection line 232.

The pressure balance line 231 may be connected such that one side thereof communicates with an upper end portion of the reactor coolant system 21 (reactor vessel in the case of an integral reactor) and another side communicates with an upper portion of the safety injection tank 23. The pressure balance line 231 may be configured to achieve pressure balancing between the reactor coolant system 21 and the safety injection tank 23. Pressure balancing between the safety injection tank 23 and the core makeup tank 24 may be achieved by the connection line 232.

The safety injection line 241 may be configured to connect a lower portion of the core makeup tank 24 and the reactor vessel in a communication manner. The safety injection water may be injected from the core makeup tank 24 into the reactor vessel through the safety injection line 241 by gravity. The safety injection tank 23 may be located higher than the reactor vessel.

On the other hand, the discharge line 25 may be configured to discharge steam of the boundary section 20 into refueling water 30' accommodated in the IRWST 30. One side of the discharge line 25 may communicate with the boundary section 20 and another side of the discharge line 25 may communicate with the IRWST 30.

Specifically, one side of the discharge line 25 may be connected to communicate with the upper part of the first boundary portion 201 and another side of the discharge line 25 may be connected to communicate with the lower portion of the IRWST 30.

The check valve 25a may be disposed in an upper side of the discharge line 25. The check valve 25a may be operated by a difference between internal pressure of the boundary section 20 and pressure of the refueling water of the IRWST 30. The check valve 25a may be open when the internal pressure of the boundary section 20 is higher than the pressure of the IRWST 30, while closed when the internal pressure of the boundary section 20 is lower than the pressure of the IRWST 30. The check valve 25a may limit a flowing direction of steam inside the boundary section 20 to a single direction. The check valve 25a may force the steam inside the boundary section 20 to move to the IRWST 30. That is, the check valve 25a may prevent the refueling water of the IRWST 30 from moving to the boundary section 20 along the discharge line 25.

A jet device 251 may be provided in a lower side of the discharge line 25. The jet device 251 may be disposed in an end portion of the discharge line 25. The jet device 251 may be configured to jet the steam inside the boundary section 20, which flows along the discharge line 25, into the refueling water. The jet device 251 may be disposed adjacent to a bottom surface of the IRWST 30. The jet device 251 may extend to be in parallel to the bottom surface of the IRWST 30. The jet device 251 may include a plurality of jet holes 252. The jet device 251 may be configured to be soaked in the refueling water. Therefore, the steam inside the boundary section 20 may be discharged into the refueling water 30' accommodated in the IRWST 30 along the discharge line 25 due to the pressure difference between the first space 20a and the second space 20b upon an occurrence of an accident in the nuclear power plant 100. At this time, the check valve 25a provided in the discharge line 25 may be operated to prevent the refueling water 30' accommodated in the IRWST 30 from flowing back into the first space 20a.

Further, the boundary section 20 may be provided inside the containment 10 to partition the inside of the containment 10 into the first space 20a accommodating the reactor coolant system 21 and the second space 20b that is defined between the first space 20a and the containment 10. In addition, the boundary section 20 may be configured in a sealing structure to prevent steam and radioactive materials from leaking into the second space 20b when an accident occurs in the nuclear power plant 100.

Accordingly, the first space 20a inside the boundary section 20 may contain steam or radioactive materials that are emitted upon an occurrence of a nuclear power plant accident such as a steam line break accident or a loss of coolant accident (LOCA). Accordingly, the boundary section 20 may be formed with a design pressure capable of withstanding pressure of vaporized steam upon an occurrence of an accident.

The refueling water 30' may be accommodated in the IRWST 30. During refueling operations of the nuclear power plant 100, a refueling water supply line (not shown) may be connected between the IRWST 30 and the reactor coolant system 21 such that the refueling water flow therealong. The refueling water supply line may supply the refueling water to the reactor coolant system 21.

An emergency cooling tank (ECT) 40 may be disposed outside the containment 10. Emergency cooling water may be stored in the emergency cooling tank 40. An emergency cooling water makeup line 42 may be connected to the emergency cooling tank 40.

The emergency cooling water makeup pipe may be connected such that one side thereof communicates with an upper portion of the emergency cooling tank 40 and another side is connected to an external emergency cooling water supply unit. The emergency cooling water may be injected into the emergency cooling tank 40 through the emergency cooling water makeup line.

The emergency cooling tank 40 may be configured to lower internal temperature of the boundary section 20 by condensing steam generated during a nuclear power plant accident. The steam generated in the event of the nuclear power plant accident may exchange heat with emergency cooling water 40' accommodated in the emergency cooling tank 40.

In detail, the steam generated during the nuclear power plant accident and the emergency cooling water 40' may exchange heat with each other in a heat exchanger 41 provided in the emergency cooling tank 40. As the steam generated in the boundary section 20 during the accident exchanges heat with the emergency cooling water 40' in the heat exchanger 41, condensate may be generated.

In the present disclosure, a gas-liquid separator 60 may be provided at a rear end of the heat exchanger 41 disposed in the emergency cooling tank 40, so that the condensate returns into the first boundary area (LCA) and non-condensable gas returns into the containment of the second boundary area UCA.

The first boundary area (LCA) of the radioactive material suppression facility may enclose the reactor coolant system (reactor vessel in the case of an integral reactor). The upper CPRSS cover 212 of the reactor coolant system may have a sealing structure that prevents steam and air containing radioactive materials inside the suppression facility from leaking into paths other than a discharge part during the nuclear power plant accident.

In addition, the suppression facility may be designed to resist maximum pressure generated inside the first boundary area, and may have a structure that steam and air containing radioactive materials are discharged into a tank due to a difference between internal pressure of the boundary section and pressure in a discharge part within the tank.

The second boundary area of the radioactive material suppression facility of the containment building may enclose the entire first boundary area. The second boundary area corresponds to an ultimate boundary area of the nuclear power plant.

The emergency cooling tank 40 may exist outside the second boundary area of the suppression facility and have a structure in which a large amount of water is stored.

The condensation heat exchanger 41 of the emergency cooling tank 40 may be disposed inside the emergency cooling tank 40. Steam generated from the reactor during an accident and internal air, which are mixed in the first boundary area (LCA), may be introduced into the condensation heat exchanger 41.

If a large amount of air as well as steam is introduced into condensation heat exchanger 41, heat transfer efficiency may be lowered due to non-condensable gas (air). Therefore, the gas-liquid separator 60 may be connected to the rear end of the condensation heat exchanger 41 to play a role of continuously removing the air inside the heat exchanger 41.

Hereinafter, the operating state of the long-term cooling system in the nuclear power plant 100 during the nuclear power plant accident will be described.

Figure 2:
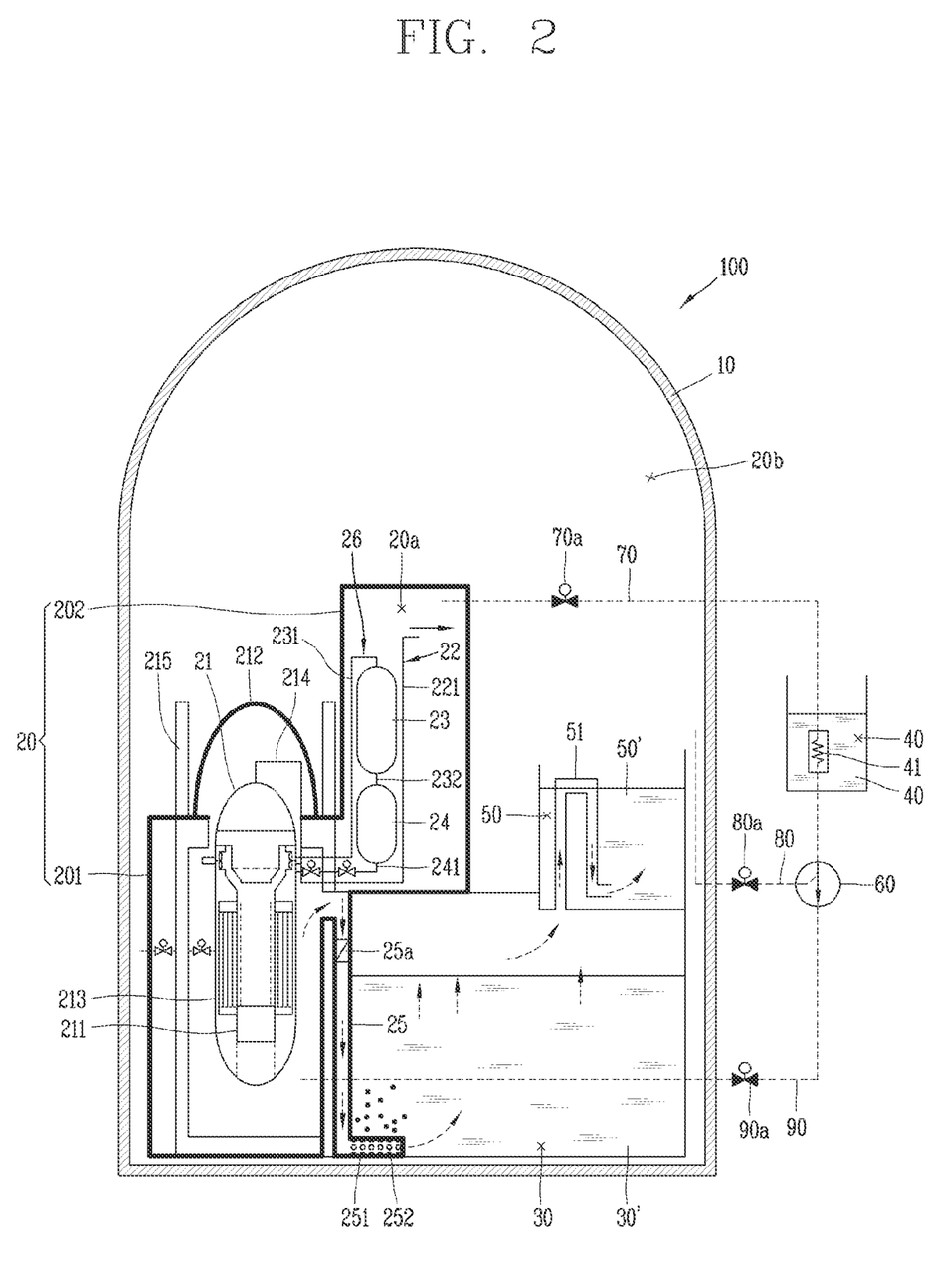
FIG. 2 is an operating state diagram illustrating a state in which steam in a boundary section is discharged to an IRWST through a discharge line at the beginning of a nuclear power plant accident.

FIG. 2 is a diagram illustrating an operating state in FIG. 1 in which steam in the boundary section 20 is discharged to the IRWST 30 through the discharge line 25 at the beginning of the nuclear power plant accident.

The passive safety system in the passive reactor may maintain the reactor in a safe condition for at least a period of time (three days, namely, 72 hours) according to the regulatory requirements by using only natural forces integrated in the system without any operator actions or AC power of safety class such as an emergency diesel generator upon an occurrence of an accident. The operator action and non-safety system involvement is allowable in the passive safety system operation after 72 hours to maintain the functions of the safety system and emergency DC power.

Hereinafter, a configuration of performing long-term cooling in a nuclear reactor upon an occurrence of an accident by using a gas-liquid separator will be described in more detail.

Figure 3:
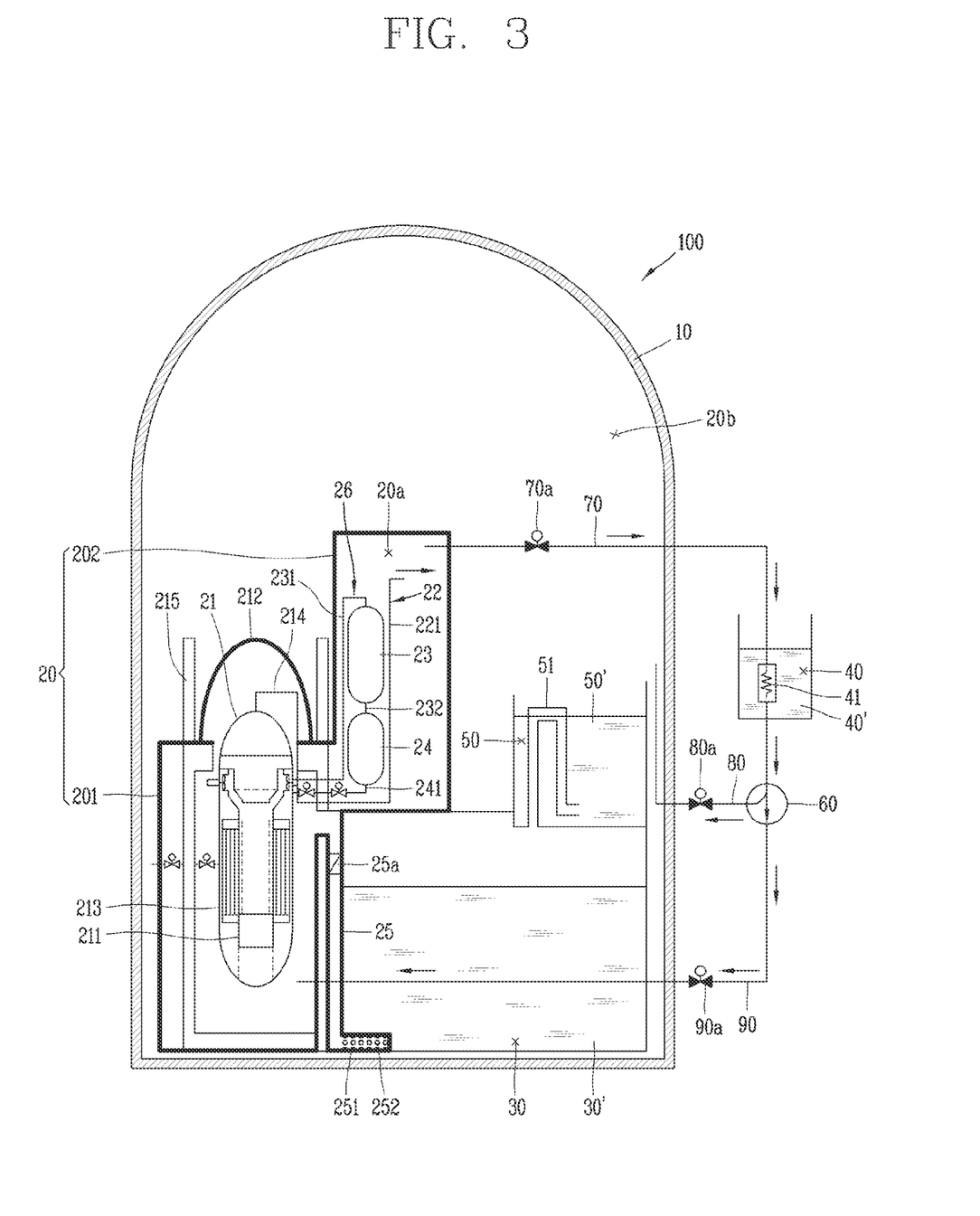
FIG. 3 is an operating state diagram illustrating a state in which a mixture of non-condensable gas and steam from a first boundary area (Lower Containment Area (LCA)) of a boundary section passes an internal condensation heat exchanger and a gas-liquid separator of an emergency cooling tank through a steam line upon an occurrence of a nuclear plant accident, such that the non-condensable gas is introduced into a second boundary area (Upper Containment Area (UCA)) inside the containment through a non-condensable gas line and the condensate is introduced into the first boundary area (LCA) through a return line.

FIG. 3 illustrates a system, shown in FIG. 1, in which a mixture of non-condensable gas and steam discharged from the first boundary area (LCA) of the boundary section 20 are separated into the non-condensable gas and condensate, for example, three days after a time point that the nuclear power plant accident has occurred.

Upon an occurrence of a breakage of a line connected to a nuclear reactor, steam and radioactive materials emitted from the nuclear reactor may be emitted into the first boundary area LCA.

Upon an occurrence of a nuclear power plant accident, steam containing radioactive materials generated from an automatic depressurization system (ADS) may be emitted into the first boundary area (LCA), and thereby a large amount of steam may exist in an upper portion of the first boundary area (LCA). At this time, the inside of the first boundary area (LCA) is already filled with air (non-condensable gas). Accordingly, steam and air may be mixed in the first boundary area (LCA) during the accident.

When the mixture is introduced into the first boundary area (LCA) without being separated into the non-condensable gas (air) and condensate, condensation efficiency inside the condensation heat exchanger 41 may be gradually lowered over time.

Therefore, there is a need of a system for separating steam mixed with air, which has been introduced therein through a steam line upon an occurrence of an accident, into non-condensable gas and condensate. A steam line valve 70*a* may be disposed in the steam line 70 of the system that separates the mixture into the non-condensable gas (air) and the condensate, a non-condensable gas line valve 80*a* may be disposed in a non-condensable gas line 80, and a first return line valve 90*a* may be disposed in a first return line 90.

Upon an occurrence of a nuclear plant accident, the three valves 70*a*, 80*a*, and 90*a* may be open once by power supplied from a battery, and steam and air inside the first boundary area (LCA) may be introduced into the condensation heat exchanger 41 in the emergency cooling tank 40 that is disposed outside the containment 10.

The steam of the steam and air introduced in the heat exchanger 41 of the emergency cooling tank 40 may be partially condensed, and the air (non-condensable gas) may be introduced as it is into the gas-liquid separator 60 that is disposed at the rear end of the condensation heat exchanger 41.

The condensate generated in the heat exchanger 41 may flow into the first boundary area (LCA) through the first return line 90, and only the air may flow back into the containment 10.

It is necessary to prevent condensation efficiency inside the condensation heat exchanger 41 from being lowered due to the air inside the first boundary area (LCA) as time elapses. The gas-liquid separator 60 may allow air inside the first space 20*a* to be discharged into the second space 20*b*.

The steam or radioactive materials inside the IRWST 30 where pressure has increased during the nuclear power plant accident may flow along a steam inlet line 51 to be jetted into cooling water 50' accommodated in the radioactive material suppression tank 50. The upper space of the IRWST 30 may be sealed by the sealing cover.

A line may be installed so that the condensate that has passed through the gas-liquid separator 60 is discharged into the refueling water 30' accommodated in the IRWST 30.

The steam or radioactive materials in the upper space of the IRWST 30 may be condensed and dissolved by the cooling water 50' and collected. The condensed steam jetted into the cooling water 50' may flow into the second space 20*b* to cool the boundary section 20 and reduce the concentration of radioactive materials.

In order to effectively reduce the radioactive materials with the cooling water 50', the cooling water 50' may receive refueling water having a pH of more than a preset value to prevent volatilization of the radioactive materials (especially iodine). The cooling water 50' may be configured to be alkaline. The cooling water 50' may have a pH of 7, and preferably may have a pH of 7.5 to 10.

FIG. 3 illustrates the system in which the mixture of the non-condensable gas and the steam discharged from the first boundary area (LCA) of the boundary section 20 generated during the nuclear plant accident are separated into the non-condensable gas and the condensate.

Specifically, FIG. 3 illustrates the operating state in which the mixture of the non-condensable gas and the steam passes through the condensation heat exchanger 41 inside the emergency cooling tank 40 and the gas-liquid separator 60 through the steam line 70, such that the non-condensable gas is introduced into the second boundary area (UCA) inside the containment 10 through the non-condensable gas line 80 and the condensate is introduced into the first boundary area (LCA) through the first return line 90.

When steam pressure inside the boundary section 20 rises above a preset pressure at the beginning of the nuclear power plant accident, the check valve 25*a* of the discharge line 25 may comply with a design standard to be open by a difference between the steam pressure inside the boundary section 20 and pressure of refueling water applied to the jet device 251.

When the steam pressure inside the boundary section 20 is higher than the pressure of the refueling water acting on the jet device 251, the check valve 25*a* may be open and the steam inside the first boundary portion 201 may thus flow down toward the jet device 251 along the discharge line 25.

The steam of the boundary section 20 may be jetted into the refueling water through jet holes 252 of the jet device 251.

When internal pressure of the reactor coolant system 21 rises above a preset pressure after a predetermined period of time has elapsed from the time point that the accident occurred in the nuclear power plant 100, the automatic depressurization system 22 may operate such that the steam of the reactor coolant system 21 moves upward along the depressurization line 221 to be introduced into the upper space of the second boundary portion 202.

The steam of the second boundary portion 202 may move along the steam line 70 connected to the second boundary portion 202 to be introduced into the heat exchanger 41. The heat exchanger 41 inside the emergency cooling tank 40 may condense the steam from the second boundary portion 202 through the heat exchange between the steam and the cooling water in the emergency cooling tank 40, thereby cooling the steam from the second boundary portion 202.

The condensate generated in the heat exchanger 41 may be introduced into the first boundary area (LCA) through the first return line 90, and only the air that is the non-condensable gas may be introduced into the second boundary area (UCA) inside the containment 10 through the non-condensable gas line 80.

At the beginning of the nuclear plant accident, the inside of the boundary section 20 may be cooled by discharging the steam inside the boundary section 20 into the refueling water 30' accommodated in the IRWST 30.

However, three days after the accident, the condensate generated in the heat exchanger 41 may flow into the first boundary area (LCA) through the first return line 90. Internal temperature of the boundary section 20 may be lowered, and internal pressure of the boundary section 20 may also be lowered.

When a predetermined period (e.g., 3 days) has elapsed after the accident occurred in the nuclear power plant 100, the steam or condensate condensed in the heat exchanger 41 may flow downward along the first return line 90 and flow through the IRWST 30 while exchanging heat with the refueling water in the IRWST 30. The heat-exchanged steam may be cooled and returned into the first boundary portion 201.

The mixture of the non-condensable gas and the steam inside the first boundary area (LCA) may be separated into the non-condensable gas and the condensate through the heat exchanger 41 provided in the emergency cooling tank 40 and the gas-liquid separator 60. Accordingly, the condensate may return into the first space 20a along the first return line 90 and the non-condensable gas may be introduced into the second space 20b inside the containment 10 through the non-condensable gas line 80.

On the basis of the design standard of the nuclear power plant, pressure that increases upon the occurrence of the nuclear plant accident may be change greatly in the order of the first space 20a that is the first boundary area (LCA), the inside of the IRWST 30, and the second space 20b that is the second boundary area (UCA). This is closely related to the fact that the boundary section 20 is implemented in the sealing structure to prevent leakage of steam and radioactive materials into the second space 20b upon an occurrence of a nuclear power plant accident.

Therefore, the mixture of the steam and the non-condensable gas may be separated into the non-condensable gas and the condensate through the heat exchanger 41 provided in the emergency cooling tank 40 and the gas-liquid separator 60, and only the non-condensable gas may be introduced into the first space 20a as the first boundary area in which the greatest pressure change occurs.

Since the gas-liquid separator 60 can maintain a circulation line for discharging air inside the first space 20a into the second space 20b for a long-term of time, long-term cooling can be performed upon an occurrence of a nuclear power plant accident.

Figure 4:
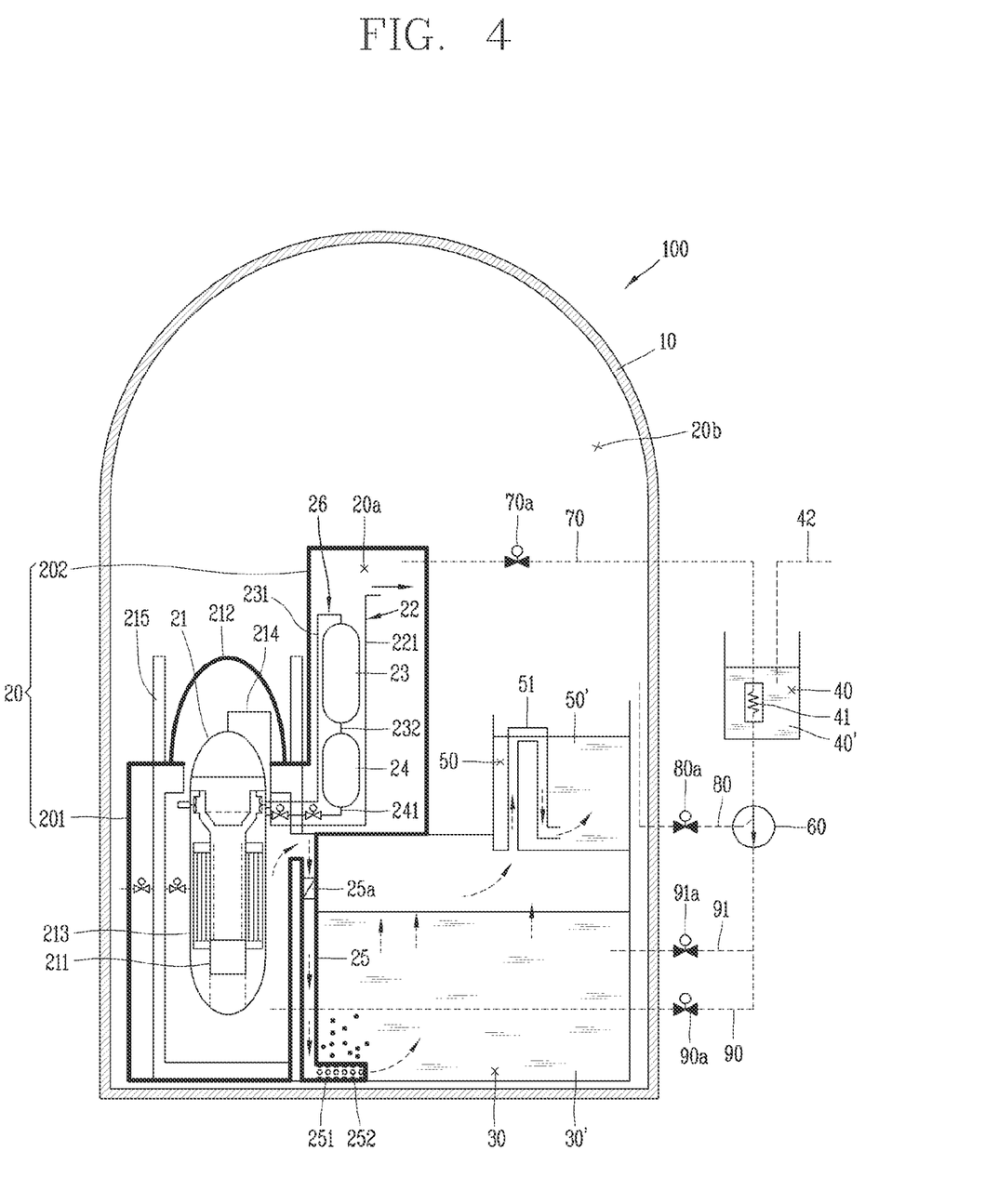
FIG. 4 is a conceptual diagram illustrating a nuclear power plant having a long-term cooling system equipped with a gas-liquid separator that includes an emergency cooling water makeup line and a second return line.

FIG. 4 is a conceptual diagram illustrating a long-term cooling system in a nuclear power plant, provided with an emergency cooling water makeup line and a second return line.

An emergency cooling water injection line 42 may be connected to the emergency cooling tank 40 disposed outside the containment 10.

An emergency cooling water makeup line 42 may be connected such that one side thereof communicates with an upper portion of the emergency cooling tank 40 and another side is connected to an external emergency cooling water supply unit. The emergency cooling water may be injected into the emergency cooling tank 40 through the emergency cooling water makeup line 42.

A second return line 91 may be connected such that one side thereof is connected to a condensate discharge line of the gas-liquid separator 60 and another side communicates with the inside of the IRWST 300.

A second return line valve 91a may be disposed in the second return line 90 to open and close the second return line 91.

The second return line 91 may extend from the condensate discharge line of the gas-liquid separator 60 such that the condensate can be discharged into the refueling water 30' accommodated in the IRWST 30 therethrough.

According to a long-term cooling method using a long-term cooling system in a nuclear power plant, steam and radioactive materials emitted from a nuclear reactor may be discharged to a boundary section within a containment by a depressurization system.

A steam line valve may be opened to discharge a mixture of steam and air within an upper portion of a first boundary area.

The steam and air may be introduced into a condensation heat exchanger installed inside an emergency cooling tank located outside the containment.

At least part of the steam of the introduced steam and air may be condensed in the condensation heat exchanger, and then introduced into a gas-liquid separator disposed at a rear end of the condensation heat exchanger.

Condensate separated in the gas-liquid separator may be introduced into the boundary section through a return line.

The long-term cooling method may further include introducing non-condensable gas separated in the gas-liquid separator into the boundary section within the containment.

It is obvious to those skilled in the art that the present disclosure can be embodied in other specific forms without departing from the concept and essential characteristics thereof.

Also, the detailed description should not be limitedly interpreted in all the aspects and should be understood to be illustrative. The scope of the present disclosure should be determined by rational interpretation of the appended claims, and all changes within the scope of equivalents of the present disclosure are included in the scope of the present disclosure.

What is claimed is:

1. A cooling system in a nuclear power plant, the system comprising:
    a boundary section disposed inside a containment configured to be divided into a first area and a second area disposed inside the containment, the boundary section disposed between the first area (Lower Containment Area (LCA)) and the second area (Upper Containment Area (UCA)) of a radioactive material suppression facility, wherein the boundary section is formed to surround the first area (LCA), wherein the first area (LCA) is a first space of an inner area of the boundary section, and the second area (UCA) is a second space that is an upper area inside the containment at the outside of the boundary section, wherein the boundary section is configured to prevent steam and radioactive materials from leaking into the second space (UCA) when an accident occurs in the nuclear power plant, and then the first space (LCA) contains steam or radioactive materials;

an In-Containment Refueling Water Storage Tank disposed outside the boundary section and configured to store refueling water therein;

an emergency cooling tank disposed outside the containment and provided with a condensation heat exchanger;

a gas-liquid separator disposed outside the containment and connected to the emergency cooling tank; and a return line configured to connect the gas-liquid separator and the boundary section such that condensate is discharged toward the boundary section upon an occurrence of the nuclear power plant accident, the condensate being generated by condensing the steam of the boundary section through the emergency cooling tank and the gas-liquid separator, wherein the return line extends from a condensate discharge line of the gas-liquid separator and is disposed such that the condensate separated through the gas-liquid separator passes through the in-containment refueling water storage tank, wherein if the nuclear power plant accident occurs, steam and air discharged to the containment are introduced into the condensation heat exchanger through a steam line, and at least part of the introduced steam is condensed and introduced into the gas-liquid separator disposed at a rear end of the condensation heat exchanger, to be separated into non-condensable gas and the condensate, wherein the non-condensable gas separated through the gas-liquid separator flows into the containment along a non-condensable gas line, and the condensate separated through the gas-liquid separator flows into the boundary section along the return line.

2. The cooling system of claim 1, further comprising a steam line valve, a non-condensable gas line valve, and a return line valve, wherein the steam line valve, the non-condensable gas line valve, and the return line valve are open by power supplied from a battery during the nuclear power plant accident, and in response to opening the steam line valve, the non-condensable gas line valve, and the return line valve, the steam and air accommodated in the boundary section is introduced into the condensation heat exchanger of the emergency cooling tank.

3. The cooling system of claim 1, wherein the emergency cooling tank stores emergency cooling water therein to exchange heat with the steam discharged from a boundary section within the condensation heat exchanger, and the system further comprises an emergency cooling water makeup line configured to make up externally supplied emergency cooling water into the emergency cooling tank.

4. The cooling system of claim 1, wherein the steam accommodated in the boundary section is discharged into the refueling water accommodated in the in-containment refueling water storage tank through a discharge line due to a pressure difference between inside and outside of the boundary section during the nuclear power plant accident.

5. The cooling system of claim 4, wherein the discharge line is provided with a check valve disposed therein to prevent backflow, and the steam of the boundary section is discharged into the refueling water accommodated in the in-containment refueling water storage tank through a jet device, the jet device being disposed in a lower end portion of the discharge line to be adjacent to a bottom surface of the in-containment refueling water storage tank and having a plurality of jet holes.

6. The cooling system of claim 4, wherein the in-containment refueling water storage tank is provided with a radioactive material suppression tank disposed on an upper end thereof to accommodate alkaline cooling water.

7. The cooling system of claim 1, further comprising a reactor coolant system, wherein the boundary section comprises:

a first boundary portion disposed to enclose the reactor coolant system; and a second boundary portion communicating with the first boundary portion and disposed to enclose a safety injection system for injecting emergency cooling water into the reactor coolant system.

8. The cooling system of claim 7, wherein the safety injection system comprises at least one of a safety injection tank and a core makeup tank connected to the reactor coolant system in a communicating manner.

* * * * *